United States Patent
Nowak et al.

(10) Patent No.: US 9,514,046 B1
(45) Date of Patent: Dec. 6, 2016

(54) DYNAMIC DETECTION AND SOFTWARE CORRECTION OF INCORRECT LOCK AND ATOMIC UPDATE HINT BITS

(71) Applicant: International Business Machines Corporation, Armonk, NY (US)

(72) Inventors: Benjamin Carter Nowak, Austin, TX (US); Guy Lynn Guthrie, Austin, TX (US); Venkat R. Indukuru, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/735,429

(22) Filed: Jun. 10, 2015

(51) Int. Cl.
*G06F 12/00* (2006.01)
*G06F 12/08* (2016.01)

(52) U.S. Cl.
CPC ....... *G06F 12/0815* (2013.01); *G06F 12/0804* (2013.01); *G06F 2212/1016* (2013.01); *G06F 2212/1032* (2013.01); *G06F 2212/281* (2013.01); *G06F 2212/608* (2013.01); *G06F 2212/62* (2013.01)

(58) Field of Classification Search
CPC .............. G06F 12/0815; G06F 12/0804; G06F 2212/1016; G06F 2212/62; G06F 2212/281; G06F 2212/1032; G06F 2212/608
See application file for complete search history.

(56) References Cited

U.S. PATENT DOCUMENTS

| | | | | |
|---|---|---|---|---|
| 6,076,183 A * | 6/2000 | Espie | ................... | G06F 11/106 714/6.1 |
| 7,343,592 B2 * | 3/2008 | Bell, Jr. | .............. | G06F 11/3428 703/22 |
| 7,571,165 B2 | 8/2009 | Eigemann et al. | | |
| 8,327,075 B2 | 12/2012 | Irish et al. | | |
| 2002/0083312 A1 * | 6/2002 | Sinharoy | ............. | G06F 9/30047 712/240 |
| 2007/0219999 A1 | 9/2007 | Richey et al. | | |
| 2010/0002692 A1 * | 1/2010 | Bims | ..................... | H04L 1/0009 370/389 |
| 2011/0219208 A1 * | 9/2011 | Asaad | ..................... | G06F 15/76 712/12 |
| 2013/0024662 A1 * | 1/2013 | Renganarayana | .... | G06F 9/3004 712/208 |
| 2015/0161054 A1 * | 6/2015 | Ghai | ................... | G06F 12/0888 711/135 |

* cited by examiner

*Primary Examiner* — John A Lane
(74) *Attorney, Agent, or Firm* — Joseph Petrokatis; Darcell Walker

(57) ABSTRACT

A hint bit detection and correction method uses two additional bits as part of every cache directory. These bits represent the lwarx and stwcx instructions (larx disp, stcx disp). When a hint bit event occurs, depending the on combination of these two bits, there can be an indication of a hint bit error. Once a hint bit error is detected a software interrupt is issued and the hint bit correction method identifies and corrects the incorrect hint bit.

10 Claims, 6 Drawing Sheets

DYNAMIC DETECTION AND SOFTWARE CORRECTION OF INCORRECT LOCK AND ATOMIC UPDATE HINT BITS

FIELD OF THE INVENTION

This invention relates to a method for correcting incorrect hint bits computing systems. More particular, this invention relates to a method for dynamically detecting incorrect hint bits during Lwarx and stwcx instructions. This invention also relates to a method for correcting detected incorrect hint bits. Still, more particular, this invention relates to a software method for dynamic correction of incorrect Lock and Atomic Update hint bits.

BACKGROUND OF THE INVENTION

Computing devices and computing systems operate in environments that have multiple processors. In many of these multiple processor environments, the multiple processors can have access to the same data resources. In this environment, you can have 2 cores (computer processors) competing for a line (same piece of data). The data will be moved back and forth between the caches of the two processors. There is a need to ensure that at any given time only one processor will be allowed to modify the data. Also, when the data is modified, the other processors on the line are informed. The value that a processed cached for that data may no longer be the accurate value for that data.

In power hardware, there are two special instructions (lwarx and stwcx) to allow the atomic update data (read-modify and store it back as one action). This is done in one action so that anyone looking at it could not see any intermediate state. Also, if two processors are performing the same type of activity, one would be able to get an update to the line, before sending their update.

A lwarx instruction will grab a reservation on a line that tells the hardware that the line will be modified and wants the right to modify the line. Stwcx instruction will commit the changes back to that data. This process will fail if someone else had a reservation to the line and committed their changes before you.

The hint bit sets the line (resource) and does not permit changes before line is released. The hint bit tells the hardware when you want to perform a change whether to keep the line local or release the line. If the hint bit is set wrong, then the line will bounce around unnecessarily and cause performance problems.

Power computing systems can also have local cache memory locations associated with each processor. Because of the multiple cache devices, the computing system needs to have cache coherency. In computing, cache coherence refers to the consistency of data stored in local caches of a shared resource. In a shared memory multiprocessor system with a separate cache memory for each processor, it is possible to have many copies of any one instruction operand: one copy in the main memory and one in each cache memory. When one copy of an operand is changed, the other copies of the operand must be changed also. Cache coherence is the discipline that ensures that changes in the values of shared operands are propagated throughout the system in a timely fashion. There are three distinct levels of cache coherence.

1) Every write operation appears to occur instantaneously.
2) All processors see exactly the same sequence of changes of values for each separate operand.
3) Different processors may see an operation and assume different sequences of values (this is considered non-coherent behavior).

In both level 2 behavior and level 3 behavior, a program can observe stale data. Recently, computer designers have come to realize that the programming discipline required to deal with level 2 behavior is sufficient to deal also with level 3 behavior. Therefore, at some point only level 1 and level 3 behavior will be seen in machines.

Along with the cache coherency is a coherency protocol. This protocol maintains the consistency between all the caches in a system of distributed shared memory. The protocol maintains memory coherence according to a specific consistency model. Older multiprocessors support the sequential consistency model, while modern shared memory systems typically support the release consistency or weak consistency models.

Transitions between states in any specific implementation of these protocols may vary. For example, an implementation may choose different update and invalidation transitions such as update-on-read, update-on-write, invalidate-on-read, or invalidate-on-write. The choice of transition may affect the amount of inter-cache traffic, which in turn may affect the amount of cache bandwidth available for actual work. This should be taken into consideration in the design of distributed software that could cause strong contention between the caches of multiple processors.

Regarding setting the hint bit, softwate has ability to set a hint bit on a lwarx instruction that specifies STCX operation in the L2, codes can either be:

"lock"→lwarx/stcx/critical section/store to release the lock

"atomic update"→lwarx/critical section/stwcx.

A major cause of performance problems in the field has been related to SW setting these bits incorrectly, which lead to serious performance scaling issues.

The lwarx instruction can have a field for a hint bit that tells a computer compiler whether an action is an Atomic Update or a Lock action. If the compiler sets the hint bit correctly, the hardware will keep the line (data, resource, etc.) reserved when a process is still using the line. If the hint bit is not correctly set, this status indicates that the line is available for other processes. If other processes attempt to reserve the line prior to release by the current process that has it reserved, the line could move around between processes and thereby cause a decrease in performance.

Currently, incorrect hint bit detection is based on observations from individual computer personnel. These persons evaluate the performance a line and through experience can estimate whether there is a problem with incorrect hint bits. There remains a need for a method and system that can automatically and dynamically detect an incorrect hint bi and initiate actions to correct that incorrect hint bit.

SUMMARY OF THE INVENTION

This invention provides a mechanism to dynamically detect incorrect hint bit usage and alert static/dynamic optimizers so that corrective action can be taken. This detection can occur during lwarx and stwcx instructions. A hint bit detection mechanism comprises two (2) additional bits (larx disp, stcx disp) as part of every cache directory. Combinations of these two additional bits will indicate when a hint is likely to be correctly set and more importantly when a hint bit is likely to be incorrectly set. If a hint bit event occurs while the bit pair has a predefined value, an incorrect hint bit alert can triggered indicating that there is an incorrect hint set for a line.

After the detection of an incorrect hint bit, the alert would trigger a software response. The response in the present invention will issue a PMU interrupt. The PMU interrupt can be used by a software advisor to alert the programmer of the incorrect hint bit. The PMU interrupt can be used by profiling compilers to capture SDAR and generate better hint bits on a recompile operation. The PMU interrupt could be used by compilers and dynamic optimization systems to modify the code. The code modification will correct in the detected incorrect hint bit.

DETAILED DESCRIPTION OF THE INVENTION

Figure 1:
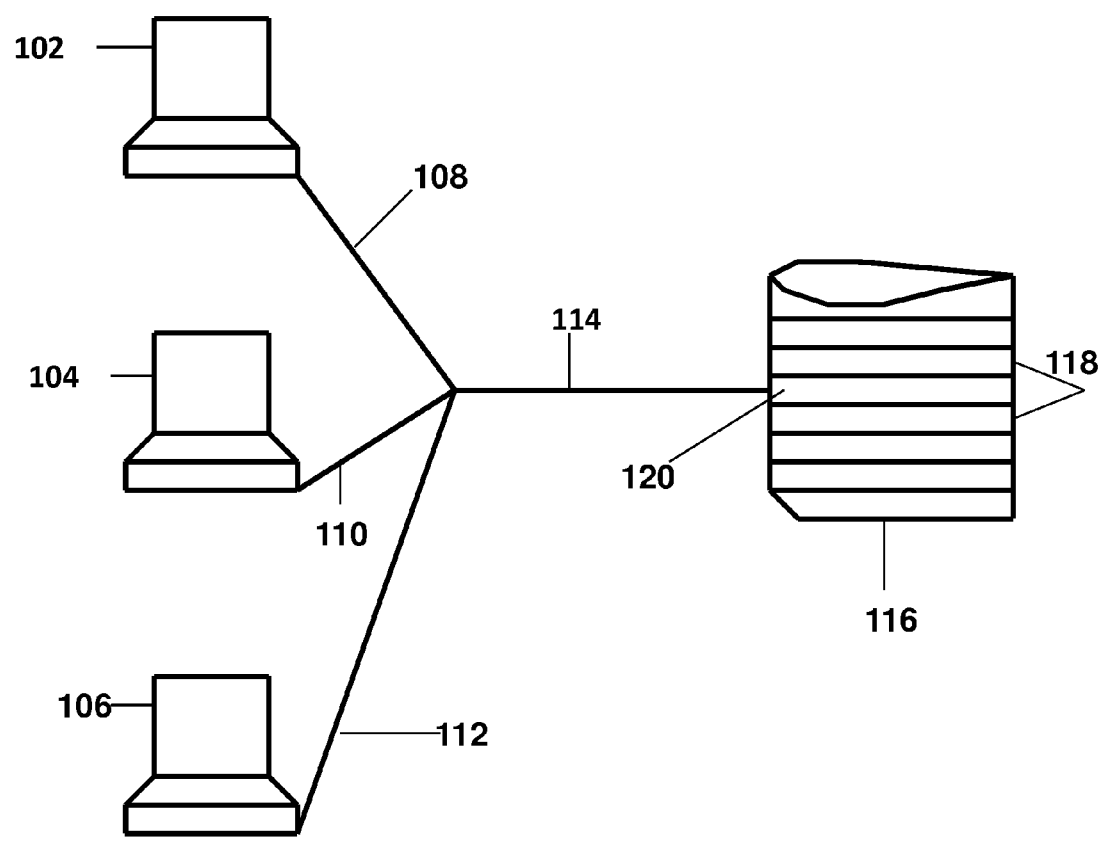
FIG. 1 is a view of a configuration of a computing system with multiple processes that have the capability to access a resource.

In a computing environment, there can be 2 cores (computer processors) competing for a line (same piece of data). FIG. 1 shows a configuration of a computing system with three processors 102, 104 and 106. Each processor has a link 108, 110 and 112 respectively to a line 114. This line, 114, connects the processors to the memory resource 116. In this memory resource are data sets 118. Each processor has the capability to access any of the data sets. For example, in this FIG. 1 configuration, all three processors may want to access and reserve data set 120. The data will be moved back and forth between the caches of the three processors. However, there is a need to ensure that at any given time only one processor will be allowed to access/hold/modify the data set. Also, when the data is modified, the other processors having access to the line must be informed on the data modification. The value that a processor's cached has for that data may no longer be the accurate value for that data.

In power hardware, there are two special instructions to allow an atomic update data (read-modify and store it back as one action). This atomic update is done in one action so that anyone looking at it could not see any intermediate state. Also, if the three processors are performing the same type of activity, one would be able to get an update to the line, before sending their update.

As mentioned, the lwarx and stwcx instructions are used in the process of accessing the data set 120. These instructions (lwarx and stwcx) are primitive or simple, instructions used to perform a read-modify-write operation to storage (data set). The lwarx instruction loads the word from the location in storage specified by the EA into the target GPR RT. In addition, a reservation on the memory location is created for use by a subsequent stwcx instruction. The lwarx instruction has one syntax form and does not affect the Fixed-Point Exception Register. If the EA is not a multiple of 4, the results are boundedly undefined. If the store operation is performed, the use of the lwarx and stwcx instructions ensures that no other processor or mechanism has modified the target memory location 120 between the time the lwarx instruction is executed and the time the stwcx instruction completes.

Figure 2:
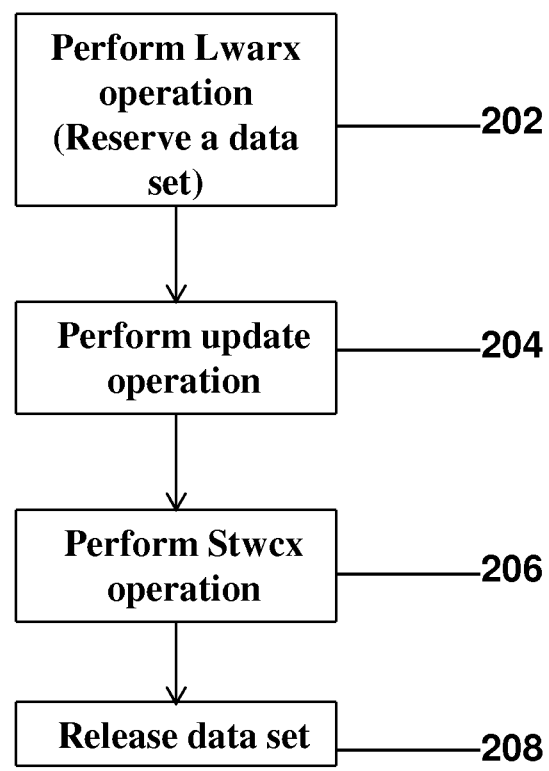
FIG. 2 is a flow diagram of an Atomic Update operation using the lwarx and stwcx instructions.

FIG. 2 illustrates the steps in an atomic update using the lwarx and stwcx instructions. In step 202, a lwarx instruction is performed. As mentioned, this instruction reserves the data set 120. When a lwarx instruction from a processor reserves the data set, no other process should be able to access that data set before that data set is released. Step 204 usually performs an update operation such as a pointer or value incrementation. Both of these operations are updates. At the completion of the update operation, step 206 performs the stwcx instruction. This instruction signifies that the processor that initial issued the lwarx operation has completed its use of that data set. Step 208 then releases the data set. Once released, another processor can then issue a lwarx instruction for that data set.

Figure 3:
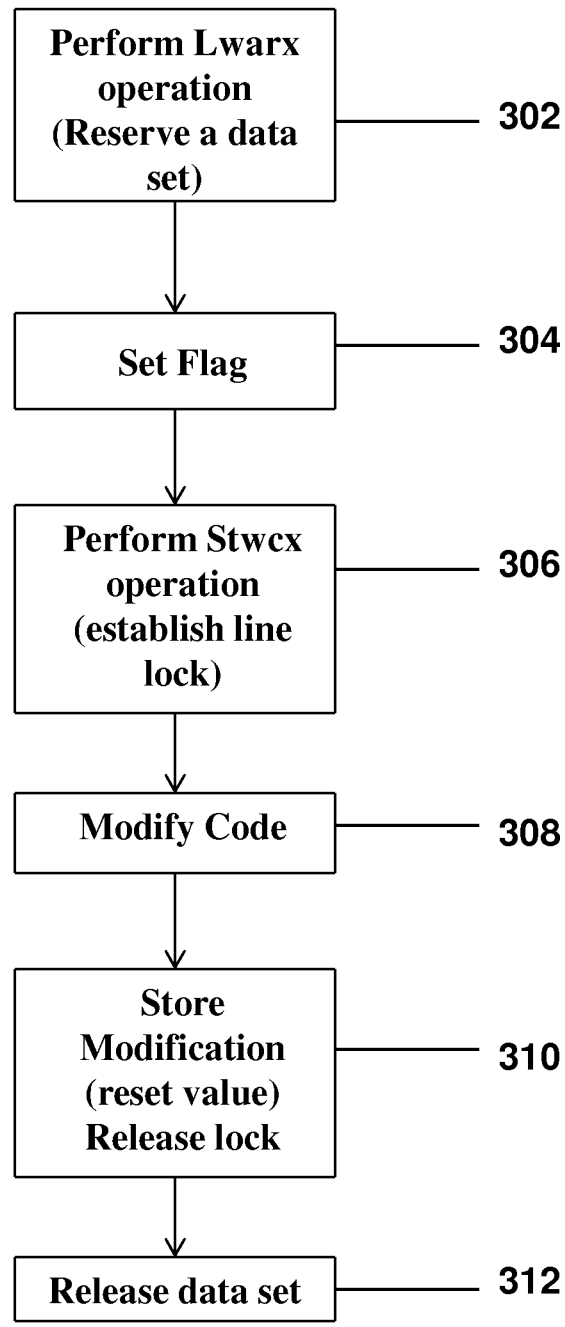
FIG. 3 is a flow diagram of a Lock operation using the lwarx and stwcx instructions.

The other relevant use of the lwarx and stwcx instructions is during the implementation of a lock operation. FIG. 3 illustrates the steps in lock operation using the lwarx and stwcx instructions. In step 302, a lwarx instruction is performed. Step 304 sets a flag indicating that the operation is more than a simple update. Step 306 performs the stwcx instruction. Step 308 modifies the code (the critical section). At the completion of the modification, step 310 stores the modification. At that point, step 312 releases the data set.

As mentioned, the hint bit sets the line and does not permit changes before line is released. The hint bit tells the hardware when you want to perform a change whether to keep the line local or release the line. If the hint bit is set wrong, then the line will bounce around unnecessarily and cause performance problems.

This present invention provides a mechanism to dynamically detect incorrect hint bit usage and alert static/dynamic optimizers so that corrective action can be taken. This detection can occur during lwarx and stwcx instructions. In this invention, a hint bit detection mechanism comprises two (2) additional bits larx disp, stcx disp) as part of every cache directory. Combinations of these two additional bits will indicate when a hint is likely to be correctly set and more importantly when a hint bit is likely to be incorrectly set. If a hint bit event occurs while the bit pair has a predefined value, an incorrect hint bit alert can triggered indicating that there is an incorrect hint set for a line.

The present invention proposes a mechanism to dynamically detect and correct code sequences that exhibit this behavior. This mechanism can detect when incorrect hint bits are being used and dynamically correcting code behavior to deliver out of the box performance for customers. Below is the code for an implementation of the present invention for an atomic update.

```
define my_atomic_fetch_and_add(mem, constant) \
({ \
long _tmpval; \
_asm _volatile ( \
"1: lwarx %0,0,%3\n" \
"addi %1,%0,%4\n" \
"stwcx. %1,0,%3\n" \
"bne- 1b\n" \
: "=&b" (_tmpval), "=&r" (_tmp0), "=m" (*mem) \
: "b" (mem), "i" (constant), "m" (*mem) \
: "cr0", "memory"); \
})
```

With atomic update code sequence, the lwarx instruction is used to set reservation and then after critical section is executed the stcx resets the reservation. If the stcx was successful then the critical section was updated atomically. PowerPC architecture provides a hint bit such that the subsequent stcx is likely to be the last access by the program to the shared variable for some time. This allows the coherency protocol to operate more efficiently. Typically in an atomic update code sequence the lwarx gets a Mu copy of the line, and the ideal operation is for the stcx to leave the cache in M state. So that the next wlarx gets a Mu copy and M copy can go invalid. The hint bit is part of the lwarx opcode and is called the EH or exclusive access bit. If EH bit is set to zero, then hardware assumes we are doing an atomic update sequence so leaves the line in M state after the stcx. If this hint bit was incorrectly used then after the stcx the line would be in Mu state (assuming a store is coming down to release the lock), and this can lead to shared copies been given away. The current invention proposes a mechanism to detect incorrect hint bit usage and alert static/dynamic optimizers so that corrective action can be taken As a part of every cache directory we propose adding 2 bits (lwarx disp, stcx disp) The valid combinations are 0 0—
1 0—lwarx was dispatched for this line
1 1—stcx was dispatched for this line after a stcx is done for an atomic update we can either be in M state or Mu state. If a lwarx from another thread hits on a line and setting is 1 0, then it means a stcx possibly has not come down and could mean we have protection window issues, the lwarx gets S1 copy if a lwarx from another thread hits on a line and setting is 1 1, then it means a stcx was dispatched and line is in Mu, it gives a S1 copy along with these 2 bits logic on another thread/core knows hint bit is '0' and if it sees S1 copy along with 11, then it knows wrong hint bit is set.

Lock case
054 /*
055 * This returns the old value in the lock, so we succeeded
056 * in getting the lock if the return value is 0.
057 */
058 static inline unsigned long _arch_spin_trylock(arch-_spinlock_t *lock)
059 {
060 unsigned long tmp, token;
061
062 token=LOCK_TOKEN;
063 _asm_ _volatile_(
064 "1:" PPC_LWARX(%0,0,%2,1) "\n\
065 cmpwi 0,%0,0\n\
066 bne- 2f\n\
067 stwcx. %1,0,%2\n\
068 bne- 1b\n"
069 PPC_ACQUIRE_BARRIER
070 "2:"
071: "=&r" (tmp)
072: "r" (token), "r" (&lock→slock)
073: "cr0", "memory");
074
075 return tmp;
076 }

Figure 4:
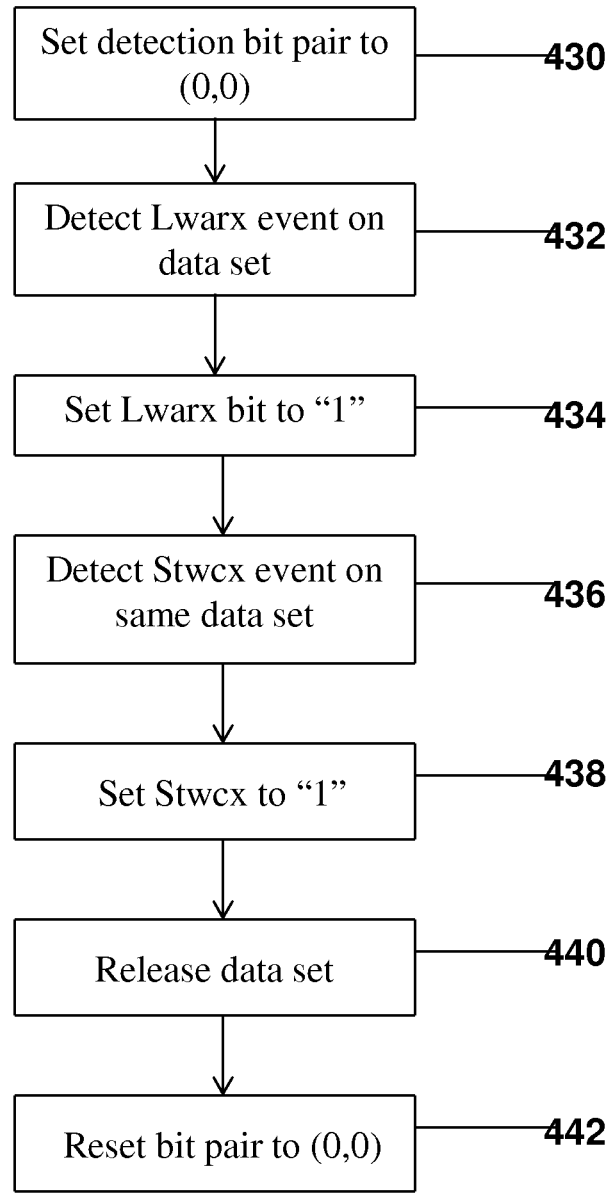
FIG. 4 is a flow diagram of a method to set the hint bit pair for detection of an incorrect hint bit in accordance with the present invention.
Figure 5:
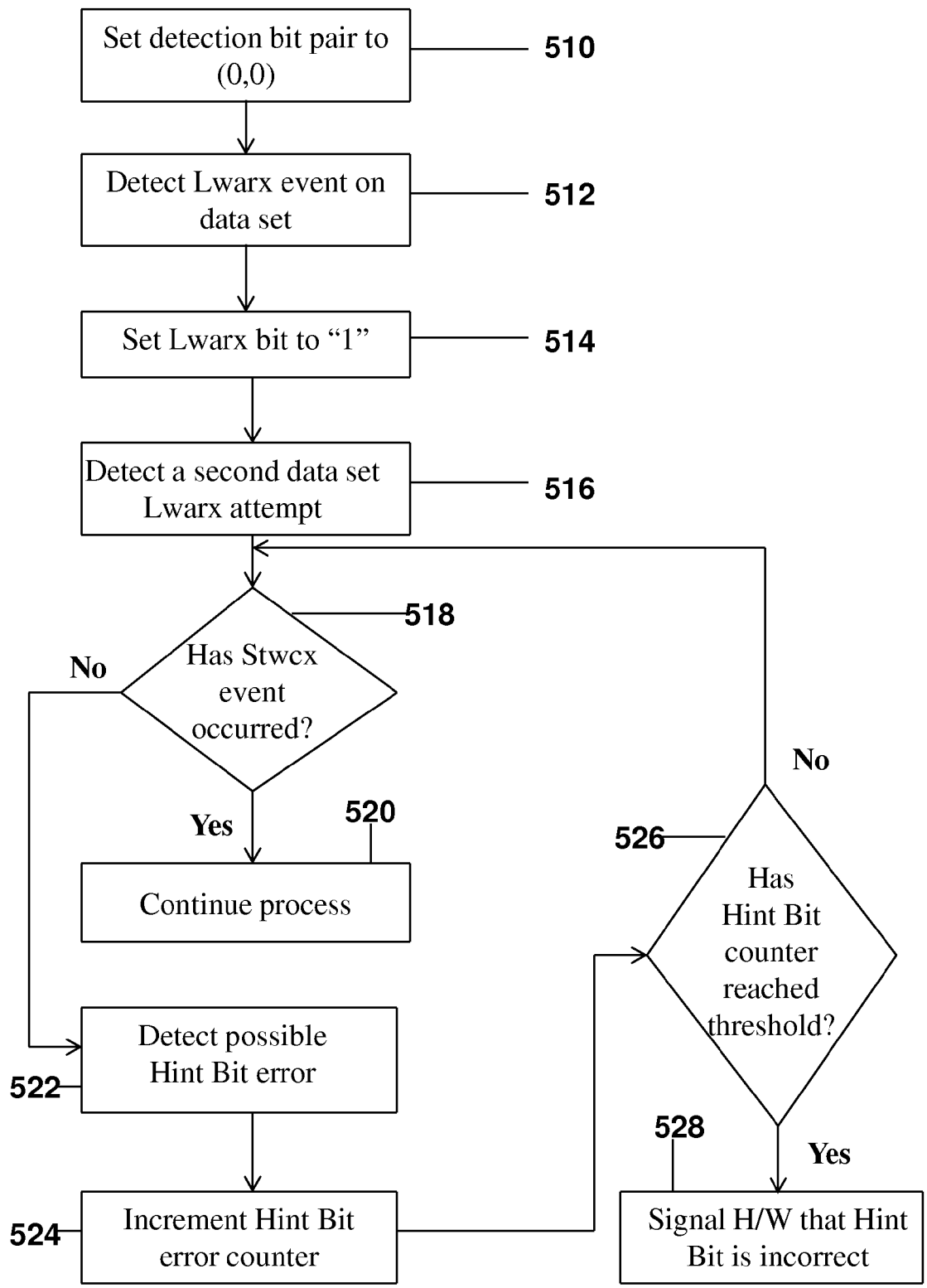
FIG. 5 is a flow diagram of the steps to detect an incorrect hint bit in accordance with the present invention.

With a lock code sequence we expect a store to release the lock after stcx, so we want to leave the line in Mu state after stcx
If another larx gets with EH=1, gets a S1 copy and 1 1→sign of contention
If another larx gets with EH=1, gets a M copy and 1 1→sign of incorrect hint bit
With a lock code sequence we expect a store to release the lock after stcx, so we want to leave the line in Mu state after stcx
If another larx gets with EH=1, gets a S1 copy and 1 1→sign of contention
If another larx gets with EH=1, gets a M copy and 1 1→sign of incorrect hint bit FIG. 4 is a flow diagram of a method to set the hint bit pair for detection of an incorrect hint bit in accordance with the present invention. This method is for an atomic update. In this method, step 430 sets the detection bits at (0, 0). Step 432 detects a lwarx instruction event on a data set. The lwarx bit of the bit pair is set to "1" in step 434. Step 436 detects a stwcx instruction event on the data set. After this detection, step 438 sets the stwcx to "1". At this point, step 440 releases the data set. At the completion of the atomic update, step 442 can reset the bit pair to (0, 0).

Figure is a flow diagram of a method of the present invention when an incorrect hint bit is detected. In step 510, the bit pair is set to (0, 0). Step 512 detects a lwarx instruction event on a data set. Step 514 then sets the lwarx bit to ("1"). At this point, a lwarx instruction from a second processor is made on the same data set that is being held by the processor that issued the initial lwarx instruction. Step 516 detects this second lwarx instruction. At this point, the "1" value in the lwarx bit indicates that a lwarx instruction has occurred for that data set. Step 518 determines whether a stwcx instruction has occurred for that data set since the initial lwarx instruction. The intent is to determine whether the processor that issued the initial lwarx instruction has released the data set with a stwcx instruction. If the determination is that a stwcx instruction for that data set has occurred, then there is no indication that the hint bit is incorrect. The process continues in step 520 and monitors the instructions. If in step 518, the indication is that the stwcx has not occurred, then there is an indication there may be an incorrect hint bit. Issuing a lwarx for a reserved line, is an indication of an incorrect hint bit. In this case, the method moves to step 522 which detects a possible hint bit error. Step 524 increments hint bit error counter. Step 526 compares the number in the hint bit counter to determine if the number in the hint bit counter has reached a threshold number. In this approach, a hint bit error detection does not mean the hint bit is incorrectly set. However, multiple error detections from the same data set can be indicative of a hint bit error. The threshold number establishes how many errors before the conclusion is that the hint bit is incorrectly set. If the determination is that the bit counter has not reached the threshold, then the method moves back to step 518. If the bit counter has reached the threshold, then step 528 issues a signal to hardware that the hint bit is incorrect. At this point, the process to correct the hint bit begins.

After detection of a hint bit error, the present invention incorporates a software hint bit correction process. In this hint bit correction process, performance counter events are created to count incorrect/correct hint events and cause a PMU interrupt. The PMU interrupt can be used by a software advisor to alert the programmer to lock functions to modify. The PMU interrupt can be used by profiling compilers to capture SDAR and generate better hint bits on the recompile. The PMU interrupt could be used by Just in time compilers and dynamic optimization systems to modify the code.

Figure 6:
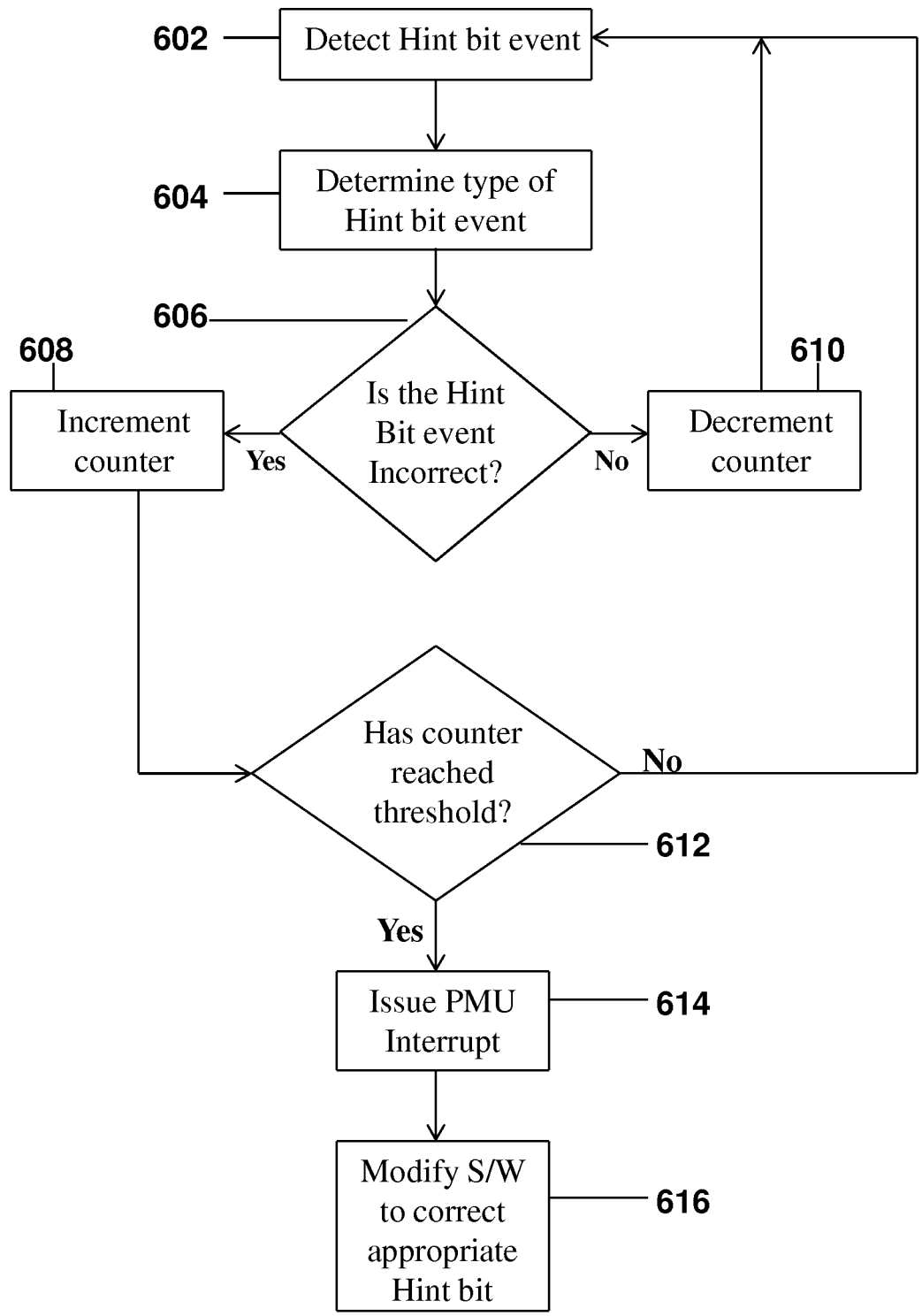
FIG. 6 is a flow diagram of the steps in a software correction method of a detected incorrect hint bit.

FIG. 6 is a flow diagram of the steps in a software correction method of a detected incorrect hint bit. Step 602 detects a hint bit event. In step 604, there is a determination of the type of hint bit. The determination is whether the hint bit is for a lwarx instruction or a stwcx instruction. Step 606 determines whether the hint bit is incorrect. Referring back to FIG. 6, this determination can be based on the value of the lwarx bit at the time of the hint bit event. If the hint bit event determines that the hint bit is correct, the hint bit error counter is decremented in step 610. Again, this move is based on activity at a data set. If some hint bit events are correct and some are incorrect, it takes a larger sample to determine if a hint bit is actually incorrect. Alternate embodiments, can respond when there is just one incorrect hint bit detection. The process then returns to step 602. If in step 606, the determination is that the hint bit is incorrect, step 608 increments the bit counter. Step 612 then determines if the bit counter has reached a predetermined threshold. If the bit counter has not reached the threshold, the method returns to step 602. However, if the bit counter in step 612 determines that the bit counter has reached the threshold, step 614 issues a PMU interrupt. The PMU interrupt can trigger the modification of the software for the hint bit that has been identified as incorrect.

It is important to note that while the present invention has been described in the context of a fully functioning data processing system, those skilled in the art will appreciate that the processes of the present invention are capable of being distributed in the form of instructions in a computer readable storage medium and a variety of other forms, regardless of the particular type of medium used to carry out the distribution. Examples of computer readable storage media include media such as EPROM, ROM, tape, paper, floppy disc, hard disk drive, RAM, and CD-ROMs.

We claim:

1. A method for detection and correction of incorrect hint bits comprising:
   setting an initial value combination for a pair of detection bits, the value combination being related to the status of a computing resource relative to lwarx or stwcx instructions;
   detecting a first hint bit event at the computing resource;
   determining a hint bit event type for the detected first hint bit event;
   setting a value of the bit pair combination based on the hint bit event type;
   detecting a second hint bit event;
   determining a hint bit type for the detected second hint bit event;
   determining hint bit correctness based on the determined detected hint bit event types and the current value of the bit pair combination; and
   issuing a system interrupt when the determination is that the hint bit is incorrect to indicate an incorrect hint bit.

2. The method as described claim 1 wherein hint bit event types can be a lwarx instruction and a stwrx instruction.

3. The method as described in claim 2 wherein the first detected hint bit event is a lwarx instruction.

4. The method as described in claim 3 wherein said bit correctness detection further comprises basing hint bit correctness on a current detection bit pair value combination indicative of a current state of a computer resource and a determined currently detected hint bit event type of a hint bit event at the computing resource.

5. The method as described in claim 2 wherein a incorrect hint bit determination is made if the second detected hint bit event is a lwarx instruction.

6. The method as described in claim 1 further comprising before said issuing of system interrupt, resetting value combination for a pair of detection bits to a default value when the second detected hint bit event is determined to be a stwrx instruction and moving to a computer resource monitoring state between said setting an initial value combination for a pair of detection bits and said detecting a first hint bit event at the computing resource.

7. The method as described in claim 1 further comprising between said determining hint bit correctness and issuing a system interrupt,
   establishing a threshold value for a hint bit correctness counter;
   incrementing the hint bit correctness counter value when a determination is that a hint bit is incorrectly set;
   determining whether the hint bit correctness counter value has reached the established threshold value; and
   moving to issue a system interrupt when the determination is that the hint bit correctness counter value has reached the established threshold value.

8. The method as described in claim 7 further comprising moving to a computer resource monitoring state between said setting an initial value combination for a pair of detection bits and said detecting a first hint bit event at the computing resource when the determination is that the hint bit correctness counter value has not reached the established threshold value.

9. The method as described in claim 1 wherein said issuing of system interrupt further comprises alerting system hardware of an incorrect hint bit.

10. The method as described in claim 9 further comprising after said issuing of system interrupt modifying system software to correct a determined incorrect hint bit.

* * * * *